Dec. 14, 1943.   H. RABEZZANA   2,336,570
SHIELDED SPARK PLUG FOR AIRCRAFT ENGINES
Filed Nov. 27, 1941

Inventor
Hector Rabezzana
By Blackmore, Spencer & Flint
Attorneys

Patented Dec. 14, 1943

2,336,570

UNITED STATES PATENT OFFICE 2,336,570

SHIELDED SPARK PLUG FOR AIRCRAFT ENGINES

Hector Rabezzana, Flint, Mich., assignor to General Motors Corporation, Detroit, Mich., a corporation of Delaware Application November 27, 1941, Serial No. 420,605

6 Claims. (Cl. 123—173)

My invention relates to spark plugs for internal combustion engines, and the same consists in certain features of the externally threaded shell of the plug and of the internally threaded recess in the cylinder head into which it is screwed in installing the plug; the object of my invention being to provide certain features of thread structure, particularly of the internal thread in the recess in the cylinder head, such that the said internal thread will be less likely to be injured as the plug is screwed into or unscrewed from the recess provided for it in the cylinder head. This result is secured by increasing the pitch of the threads and making the internal thread wider than the external thread whereby the mass and strength of the internal thread is increased beyond what has heretofore usually been the case. The more massive internal thread structure thus secured provides a stronger thread, and one less liable to be crushed, sheared, stripped or otherwise injured, as the plug is installed or removed from the engine than has heretofore commonly been the case.

Heretofore in spark plugs having an externally threaded portion around 18 millimeters in diameter designed to screw into a threaded opening in an engine cylinder head, the pitch of the threads has commonly been around 1.5 millimeters; and while the collective strength of the several internal threads has been adequate for the end to be attained, the mass of the individual internal threads when the pitch is so small has proved inadequate to avoid injury to them when the plug is installed or removed, when the threads are formed directly in a cylinder head made of aluminum. An internal thread of such fine pitch and consequent narrowness in aluminum is liable to be stripped, crushed or otherwise damaged as the plug is screwed into or removed from the opening in the engine cylinder; whereas when the pitch is made around 2 millimeters and the internal thread made wider than the external thread there is secured an internal thread structure which is sufficiently more massive that it is considerably less likely to be injured when the plug is installed or removed from the cylinder head than has heretofore been the case.

A further object of my invention is to provide a spark plug which operates at a lower temperature, that is, will be less highly heated, than heretofore; this result being secured by providing a short, direct and continuous metallic path for the flow of heat from the inner end of the spark plug to the jacketed head of the engine, into an internally threaded opening of which the plug is screwed, and to the cooling liquid within said jacket.

In the drawing accompanying and forming a part of this specification and wherein the preferred embodiment of my invention is illustrated:

Figure 1:
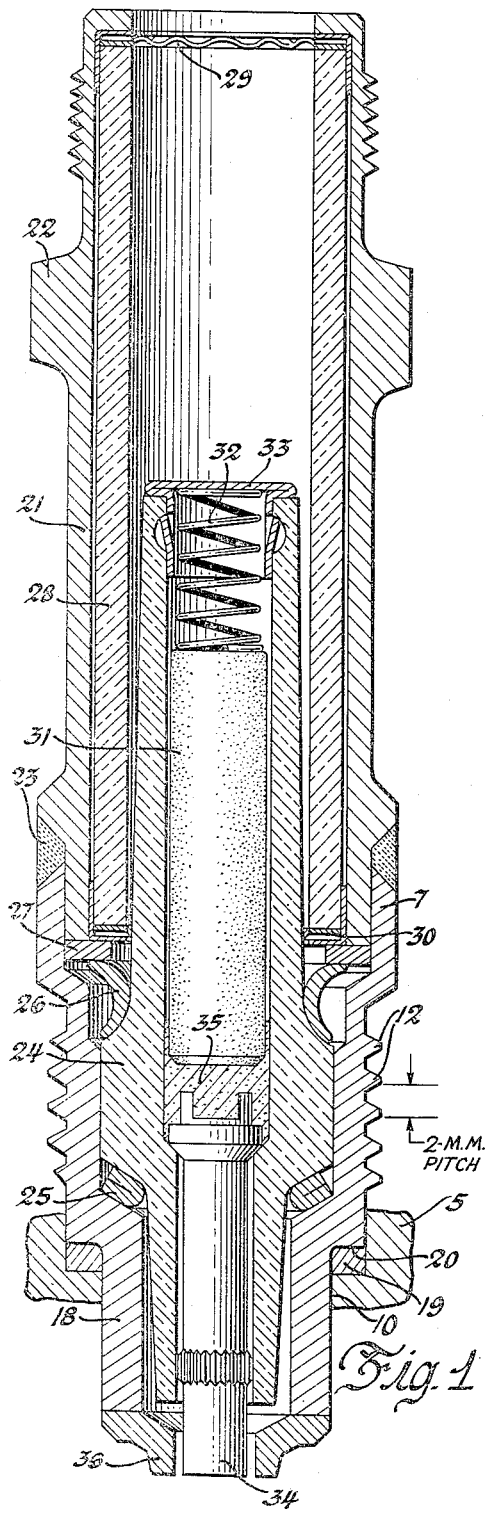
Figure 1 is a view showing a section upon a longitudinally extending central plane, of a spark plug made in accordance with my invention; the view showing the plug three or more times its normal size.
Figure 2:
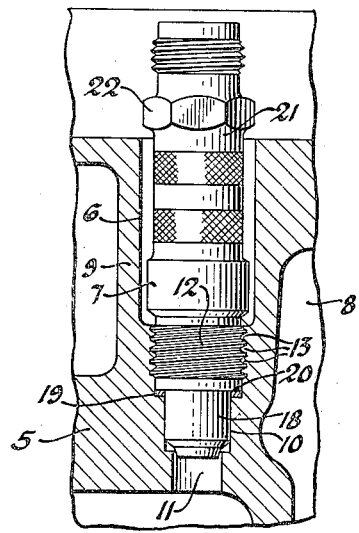
Figure 2 is a view showing the plug in elevation and screwed into an internally threaded opening provided for it in a cylinder head, the head being shown in section.
Figure 3:
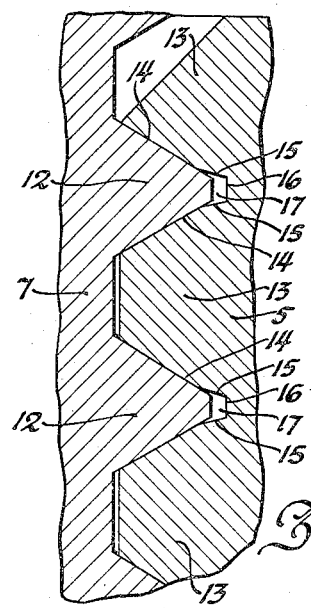
Figure 3 is a fragmentary sectional view showing the particular thread formation upon the spark plug shell, and within the opening provided for its reception in the cylinder head.

Referring now to the drawing the numeral 5 designates the head of an internal combustion engine cylinder, said head having a deep recess or well 6 which is internally threaded for a part of its length to receive an externally threaded intermediate portion of a hollow spark plug shell or casing 7; the head having an internal cooling liquid space 8 separated from the well by a tubular wall 9 as is usual in internal combustion engine cylinder heads. The inner part of this well has a cylindrical portion 10 of reduced diameter; and it communicates with the interior of the cylinder through a passage 11 as shown.

The external thread 12 of the shell 7 and the internal thread 13 within the middle portion of the recess 6 are of V-form, with their sides disposed at 60 degrees from one another, as shown, and their pitch is greater than has heretofore commonly been the case with threads of this diameter and the internal thread is wider than the external thread; to thereby reduce the liability of crushing, stripping or otherwise injuring the internal thread 13 in the cylinder head, because the cylinder head is commonly made of aluminum, and the thread is not as strong as an iron or steel thread would be. A more massive internal thread structure is thus provided and one wherein its tendency to be injured, or to be sheared along the longitudinal dimension or pitch of the thread as the plug is screwed into and removed from the recess or well 6, are reduced as compared with what has heretofore ordinarily been the case.

The optimum pitch of the thread 12 upon the steel shell 7 and the thread 13 within the recess 6 of the aluminum head, they being obviously of the same pitch, has been determined by trial and experiment; and it has been thus found that with a diameter of thread of around 20 millimeters, a pitch of approximately 2 millimeters will, if the thread on the head is made wider than the thread on the shell provide a thread (the aluminum thread 13, the steel thread 12 is inherently of ample strength) which will not crush or be stripped as the spark plug is screwed into or unscrewed from the cylinder head. This optimum pitch, however, is subject to variation, so long as a thread which is strong enough to withstand the crushing and shearing stresses incident to the installation and removal of the plug is provided.

A pitch of 2 millimeters as in the plug herein has been found to provide ample strength to resist pressure within the cylinder acting longitudinally of the plug, notwithstanding the lesser number of threads present. At the same time the more massive internal thread 13 due to the increased pitch and making the internal thread wider than the external thread will not crush or shear or be otherwise injured when the spark plug is screwed into or unscrewed from the recess provided for it in the cylinder head.

Another and independent measure of safety associated with the internal thread 13 consists in that the inner parts of the outer thread walls 14 are continued and inclined away from, or flared, relative to said outer walls, as shown at 15; and the root diameter of said thread is increased as at 16. These two features combine to provide a space or pocket 17 at the periphery of the thread 12 of the shell of greater volume than is provided by a mere flattening of the apex of the thread and the usual relief at the root of the thread 13; and this pocket acts as a receptacle for such dirt as may work outward as the plug is screwed into and unscrewed from the recess or well 6 and which might otherwise jamb between the threads and result in injury to them, particularly to the softer internal thread 13 in the cylinder head.

The threads 12 and 13 being spaced above the lower end of the shell or casing 7 and above the lower end of the recess or well 6 wherein the plug is housed it follows that they are, because of their locations, protected to a substantial degree from the highly heated gases within the engine cylinder; and more complete isolation of the threads and protection from the injurious effect of such hot gases, and a better transfer of heat from the plug to the cylinder head 5, is secured by making the inner end 18 of the spark plug shell of such a diameter that it fits closely and with minimum clearance within the cylindrical lower part 10 of the recess 6 whereby a good conducting path and one of low resistance to flow of heat is provided from the highly heated shell electrode 36 and the inner end of the plug upward and into the cylinder head, and to the cooling liquid in the jacket space 8 thereof. Such heat flow is enhanced and a more perfect gas tight joint is secured by a soft copper gasket 19 arranged between an external annular shoulder 20 of the shell and an internal ledge of like form at the upper end of the lower cylindrical part 10 of recess 6. This arrangement of the parts and features of the plug results in that the spark gap between the electrodes 34, 36 is located a substantial distance below the gasket 19 as will be appreciated.

It will be noted that the gasket 25 between the insulator 24 and the casing 7 is located well above the gasket 19 between the casing and the cylinder head 5; so that the gasket 25 will not interfere (as by a constricting or choking action) with a free flow of heat from the lower end of the insulating member and the pocket beneath said gasket, and surrounding the lower end of said insulator, which contains gas at a high temperature when the plug is in use, outward and through the zone of the casing between said two gaskets (which is of substantial width or height as will be appreciated) and into the head. This stream or flow of heat obviously mingles with the flow from the shell electrode 36 through the lower end 18 of the casing 7, and through the gasket 19 and to the cylinder head above referred to.

Although my invention is capable of use with spark plugs irrespective, except as hereinbefore appears, of other spark plug features, it is shown as used in a radio shielded spark plug having a metallic shield tube 21 extending upward beyond the upper end of the well 6 and having a hexagonal portion 22 at its upper end so that it can be readily screwed into and unscrewed from the cylinder 5; and this shield is welded or brazed to the shell or casing 7 as at 23 to make a unitary structure of the two, so that they will not be separated in screwing the plug into and removing it from the passage leading into engine cylinder provided by the recess or well 6, the cylindrical extension 10 and the passage 11.

The numeral 24 designates the usual shouldered insulating member of the plug which rests upon a gasket 25; and 26 is a resilient C-shaped metallic member which surrounds the upper part of the insulating member and is itself held in place by an annular washer 27 against which the lower end of the metallic shield tube 21 abuts as shown. The numeral 28 designates an insulating lining of ceramic material within the shield tube 21 and having cushioning members 29, 30 at its ends; the numeral 31 designates a suppressor located within a recess in the insulating member 24 and held in place therein by a spring 32 and a cap 33 as shown. The insulated electrode 34 has a conducting sealing member 35 at its upper end, and the grounded electrode 36 is welded to the inner extremity of the depending annular extension 18 of the casing 7.

Having thus described and explained my invention, I claim and desire to secure by Letters Patent:

1. A cylinder head having an internally threaded recess adapted to receive an externally threaded spark plug shell the external thread of which engages the internal thread of said recess; the inner parts of the inclined outer walls of said internal thread being continued, and inclined away from the outer parts thereof, and extended beyond the root diameter of said internal thread to thereby provide a receptacle or pocket at the extremities of said extensions and beyond the root diameter of said internal thread.

2. In combination, a cylinder head having a recess extending therethrough adapted to receive a spark plug, and a cooling liquid space surrounding said recess, and which recess has an internal annular ledge intermediate its ends; a spark plug shell having an external annular shoulder above said ledge, and a depending portion extending beyond said ledge and shoulder; an annular metallic gasket located between said shoulder and said ledge; an annular seat within said shell and located above said shoulder and ledge; an annular gasket supported by said seat and disposed above said first mentioned gasket; and an insulating member within said shell and supported by said annular seat, and which insulating member extends through and below said second mentioned gasket.

3. In an internal combustion engine, a spark plug on which there is formed an external screw thread, and a cylinder wall through which extends an opening in which there is formed an internal screw thread which corresponds to but is wider than the external screw thread on the spark plug, the spark plug being disposed within the opening with the external screw thread on it engaged with the internal screw thread in the opening.

4. In an internal combustion engine, a cylinder wall through which extends an opening in which there is formed a V internal screw thread, and a spark plug on which there is formed a V external screw thread which corresponds to the internal screw thread in the opening disposed within the opening with the external screw thread on it engaged with the internal screw thread in the opening, the crest of the external screw thread on the spark plug terminating short of the root of the internal screw thread in the opening and the sides of the internal screw thread in the opening being relieved near the root of the internal screw thread.

5. In an internal combustion engine, a spark plug on which there is formed a V external screw thread, and a cylinder wall through which extends an opening in which there is formed a V internal screw thread which corresponds to but is wider than the external screw thread on the spark plug and whose sides are relieved near the root of the internal screw thread, the spark plug being disposed within the opening through the cylinder wall with the external screw thread on it engaged with the internal screw thread in the opening and the crest of the external screw thread on the spark plug terminating short of the root of the internal screw thread in the opening.

6. In an internal combustion engine: a cylinder wall through which extends an opening in which there is between its ends an outwardly facing shoulder; and a spark plug which includes a shell in which there is between its ends an external inwardly facing shoulder and between its ends but nearer its outer end an internal outwardly facing shoulder, and an insulator from which projects an electrode disposed within and seated on the internal outwardly facing shoulder in the shell with the electrode extending to a point near the inner end of the shell; corresponding screw threads in the opening in the cylinder wall outwardly of the outwardly facing shoulder and on the shell outwardly of the external inwardly facing shoulder; the spark plug being disposed within the opening in the cylinder wall with the screw threads in the opening and on the shell interengaged, the external inwardly facing shoulder on the shell seated on the outwardly facing shoulder in the opening, and the portion of the shell inwardly of the external inwardly facing shoulder extending into the portion of the opening inwardly of the outwardly facing shoulder with its external wall in proximity to but not engaged with the wall of the opening.

HECTOR RABEZZANA.